(12) United States Patent
Ullrich et al.

(10) Patent No.: US 6,193,625 B1
(45) Date of Patent: Feb. 27, 2001

(54) RAM SPEED CONTROL METHOD AND APPARATUS

(75) Inventors: Jens Ullrich, Dresden; Karlheinz Morgenstern, Chemnitz, both of (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/273,727

(22) Filed: Mar. 22, 1999

Related U.S. Application Data

(63) Continuation of application No. PCT/EP97/05132, filed on Sep. 18, 1997.

(30) Foreign Application Priority Data

Sep. 30, 1996 (DE) .............................. 196 40 440

(51) Int. Cl.$^7$ ................ F16H 3/72; B30B 15/14
(52) U.S. Cl. ................................. 475/5; 100/48
(58) Field of Search ................ 475/1, 2, 5, 6, 475/149, 150, 151

(56) References Cited

U.S. PATENT DOCUMENTS

| | | | |
|---|---|---|---|
| 4,586,400 | * 5/1986 | Nygen ...................... | 475/2 |
| 4,825,721 | * 5/1989 | Gabriele ................... | 475/1 X |
| 5,129,317 | * 7/1992 | Gloe et al. ................ | 100/48 |
| 5,211,610 | * 5/1993 | Hurth ....................... | 475/1 |
| 5,425,682 | * 6/1995 | Hayashi .................... | 475/5 |
| 5,460,084 | * 10/1995 | Otremba et al. ........... | 100/48 X |
| 5,588,344 | * 12/1996 | Chun ........................ | 83/13 |
| 5,799,744 | * 9/1998 | Yamaguchi et al. ........ | 475/5 X |

FOREIGN PATENT DOCUMENTS

| | | |
|---|---|---|
| 629792 | 4/1936 | (DE) . |
| 4004290 | 9/1990 | (DE) . |
| 295 589 A5 | 11/1991 | (DE) . |
| 44 21 527 A1 | 12/1995 | (DE) . |
| 116014 | 8/1984 | (EP) . |
| 561604 | 9/1993 | (EP) . |
| 2258186 | 2/1993 | (GB) . |
| 59-70497 | 4/1984 | (JP) . |

OTHER PUBLICATIONS

Peter F. Brosch; "Moderne Stromirichterantriebe: Arbeitsweise drehzanhlveränderlicher Antriebe met Stromrichtern"; 1992; pp. 32–34; Chapter 6.2.4.

* cited by examiner

*Primary Examiner*—Charles A Marmor
*Assistant Examiner*—Roger Pang
(74) *Attorney, Agent, or Firm*—Laubscher & Laubscher

(57) ABSTRACT

The present invention relates to a method of controlling a ram speed of a press ram of a metal-forming press, and a driving device, in particular for carrying out this method. According to the present invention, at least one energy storage device is connected to an auxiliary drive having connected thereto the main drive for controlling the ram speed, said energy storage device having supplied thereto the energy released during a negative acceleration of the press ram while from said energy storage device additional energy for the acceleration of the press ram during a further stroke is recovered and fed into the main drive via the auxiliary drive.

12 Claims, 2 Drawing Sheets

RAM SPEED CONTROL METHOD AND APPARATUS

REFERENCE TO RELATED APPLICATIONS

Figure 1:
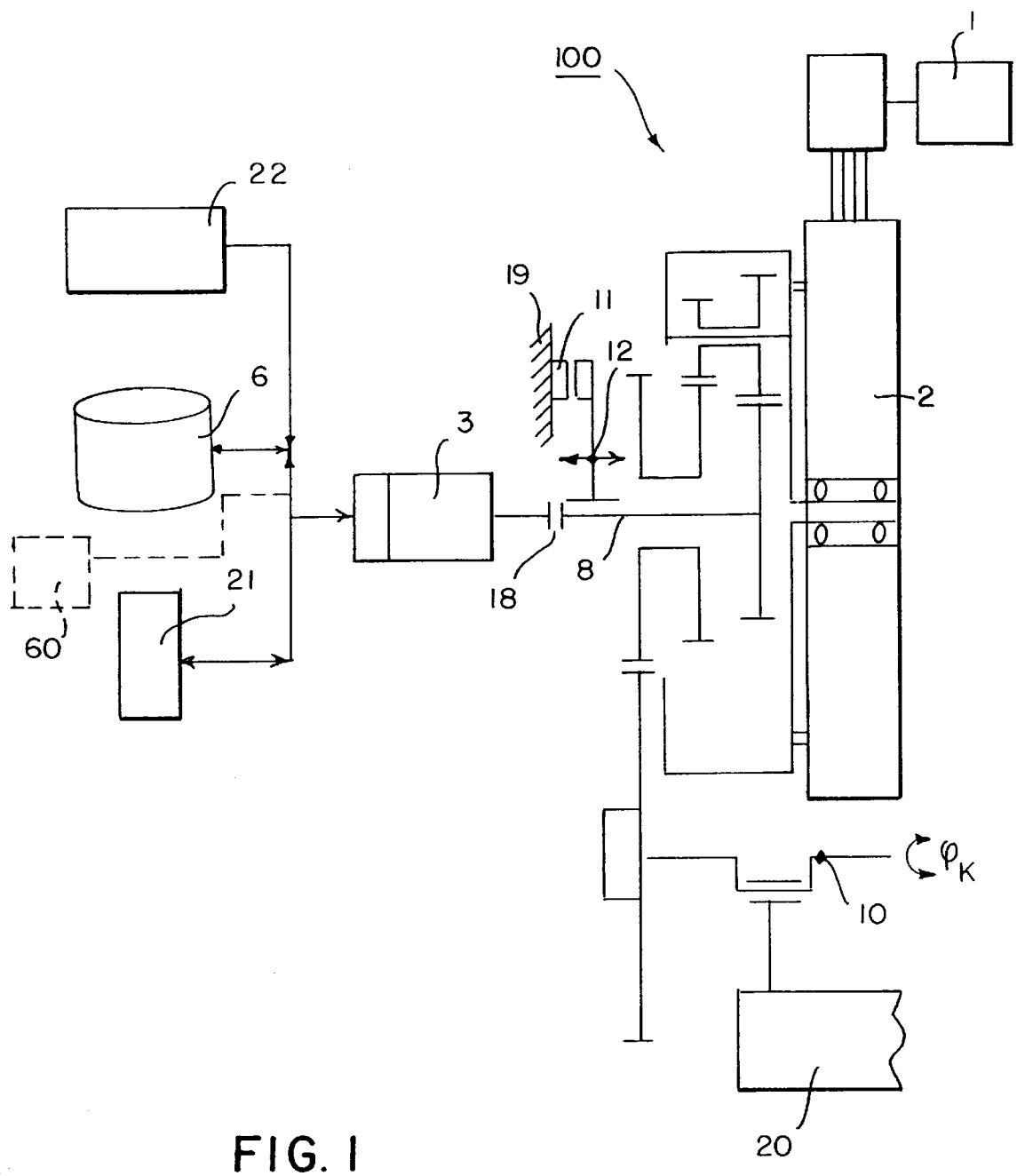

This application is a continuation of PCT Application No. PCT/EP97/05132 filed Sep. 18, 1997, based on German application No. 19640440.1 filed Sep. 30, 1996.

BACKGROUND OF THE INVENTION

1. Field of the Invention

The present invention relates to a method of controlling a ram speed of a press ram of a metal-forming press, comprising the steps of superimposing a second drive energy from an auxiliary drive on a first drive energy from a main drive and driving the press ram at the resultant speed. The present ivnention additionally relates to a driving device for a press ram of a metal-forming press.

2. Description of the Invention

The prior art discloses a large number of solutions for determining a drive characteristic (speed profile) of the press ram of a metal-forming press during a total cycle (one stroke) of the press ram, said total cycle consisting of energy supply, acceleration of the press ram, stationary phase, energy recovery and metal-forming phase.

It is, for example, known to equip a press drive with two flywheels and the associated clutches and to adjust a desired speed profile of the press ram by alternately actuating said clutches. Such drives are, however, comparatively complicated and uneconomical as far as the energy consumed is concerned.

It is also known to use for press drives of metal-forming presses single-stage planetary gearings in the case of which two different output speeds of the gearing are provided via clutch/brake combinations.

For decelerating the press ram (negative acceleration) the energy that has to be removed from the drive when shifting to a lower speed is normally dissipated as lost energy towards the machine frame and converted into frictional energy (heat) which is not suitable for further use.

German Patent No. DE 40 24 290 discloses the measure of superimposing an auxiliary drive on a main drive so as to realize arbitrary speed profiles for the press ram. The moments of inertia which have to be overcome for introducing the auxiliary energy are, however, substantial.

SUMMARY OF THE INVENTION

Hence, it is the object of the present invention to provide a method of controlling a ram speed of a press ram of a metal-forming press of the kind cited at the start and a driving device for a press ram of a metal-forming press, in particular for carrying out said method, which permit the speed profile of the press ram to be adjusted with high variability during a stroke of said press ram, and which additionally permit an adjustment of the speed characteristic of the press ram which has been improved significantly as far as the energy balance is concerned.

In the case of a method of the kind mentioned at the beginning, this object is achieved in that for a positive acceleration of the press ram the second drive energy is taken from an energy storage device and that for a negative acceleration of the press ram energy is fed back into said energy storage device.

Preferably, the moments at which the positive and the negative acceleration of the press ram begin and end are selectable freely with respect to a crank angle of a drive of the press ram so that the speed of the press ram during its phases of movement is variable with the aid of the auxiliary drive in the range of arbitrary positive and negative angles of rotation of a crankshaft driving the press ram, including the possibility of a standstill of the press ram and of a reversal of its operating movement. With the aid of the method according to the present invention, the energy which is inevitably released during a deceleration phase of the stroke in connection with the necessary speed reduction is not dissipated as energy loss but stored in energy storage devices as energy which can be reused for the future process and fed back into the press drive.

On the one hand, the control for the main movement of stroke-bound metal-forming machines can be rendered more flexible by means of said method, and, on the other hand, said method can also be used for achieving in an advantageous manner the desired impact speed of the press ram at the beginning of the metal-forming process in combination with an optimized use of energy. At the same time, it is also possible to adapt the speed characteristic of the press drive to the most advantageous speed profile of the associated handling means used for operating a metal-forming press.

With regard to the driving device for a press ram of a metal-forming press comprising a main drive and an auxiliary drive for varying a speed characteristic of the press ram in dependence upon the crank angle of said main drive, the above-mentioned object is achieved in that the auxiliary drive is arranged between the main drive and an energy storage device.

Preferably, the main drive is implemented as a motor-controlled flywheel drive with a differential gear, which is preferably implemented as a planetary gearing, and the energy which can be returned to the auxiliary drive via a process control means can be taken especially from an energy supply system acting as an energy storage device or from a discrete energy storage device, such as a magnetic-dynamic storage device or a hydraulic accumulator.

BRIEF DESCRIPTION OF THE INVENTION

Figure 2:
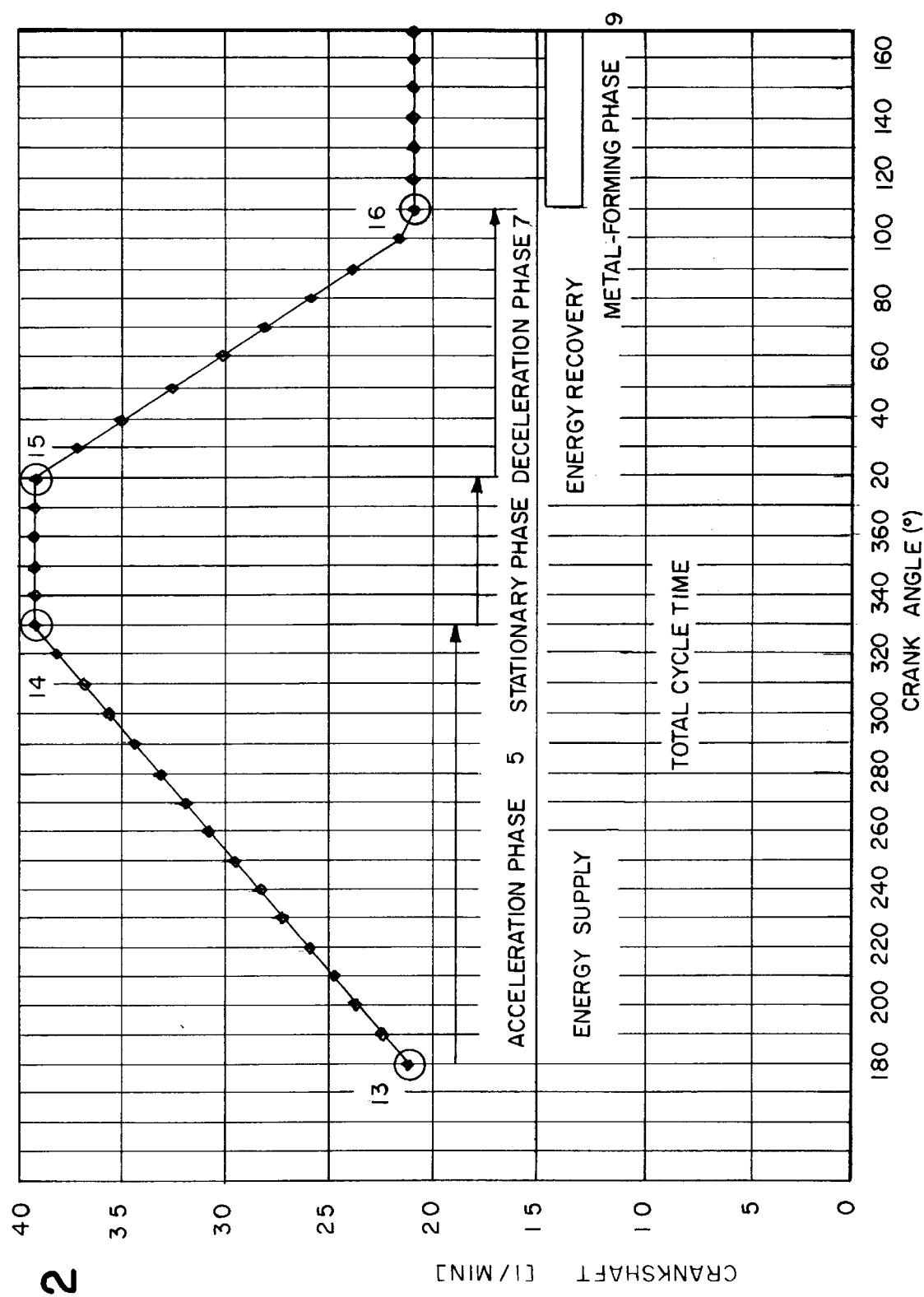

In the following, the present invention is explained in detail on the basis of an embodiment and the associated drawings, in which:

FIG. 1 shows a driving device for a metal-forming press in a schematic block diagram, and FIG. 2 shows a movement diagram for a press ram of a metal-forming press with a driving device according to FIG. 1, the number of revolutions of the crankshaft of a drive of the press ram being shown in dependence upon the crank angle of said drive.

DETAILED DESCRIPTION

FIG. 1 shows a schematic block diagram of a press drive means for a stroke-bound metal-forming press of the kind used e.g. for drawing, cutting, stamping and similar metal-forming processes, said metal-forming press being not shown in detail in the present connection. A press ram 20 of such a metal-forming press is normally driven via a crank of a crankshaft 10, a speed characteristic of the press ram 20 being controllable by varying the number of revolutions of the crankshaft 10 for different crank angles $\gamma_K$ by means of a main drive 100 and an auxiliary drive 3 (as can be seen in FIG. 2). In the main drive 100, a motor 1 operates via a transmission a flywheel 2 which transmits its energy (first or main drive energy) to a planetary gearing 4 driving the crankshaft 10 of the press ram 20 as a differential gear on the output side. For accelerating and decelerating the press ram 20 during a stroke, the main drive 100 has connected thereto an auxiliary drive 3; said auxiliary drive 3 is, on the one hand, connected to a sun gear shaft 8 of the planetary gearing 4 via a coupling point 18 and, on the other hand, connected to one or to a plurality of energy storage devices via a process control means 21, said energy storage device(s) consisting, e.g., of a discrete magnetic-dynamic energy storage device or of an energy storage device 6 which is implemented as a hydraulic accumulator and/or of an energy supply system 22 which acts as an energy storage device.

FIG. 2 shows in the form of a diagram the number of revolutions of the crankshaft 10 in dependence upon the crank angle $\gamma_K$ for the drive of the press ram 20. A stroke of the press ram 20, for a metal-forming operation (referred to as total cycle time in FIG. 2) comprises an acceleration phase 5 for the press ram 20 which is used for moving said press ram to its upper end position and which, being the dead time, should be as short as possible; this phase takes place under supply of energy with respect to a crank angle $\gamma_K$ of 200° to 330° and is defined by points 13 and 14 in FIG. 2. This acceleration phase 5 is followed by a stationary phase between points 14 and 15 with respect to a crank angle of 330° to 20° followed by a deceleration phase 7 of the press-ram movement between points 15 and 16 (crank angle $\gamma_K$ between 20° and 110°) in FIG. 2, said deceleration phase 7 being characterized by braking under energy recovery and followed by the metal-forming phase 9 (from point 16 in FIG. 2 onwards) with respect to a crank angle $\gamma_K$ of 100° to 180°.

The supply of energy into the main drive 100, which is required for the acceleration phase 5, is effected through the auxiliary drive 3 to the inlet of the planetary gearing 4 by supplying energy from the energy storage device 6 which is implemented e.g. as a magnetic-dynamic storage device or as a hydraulic accumulator, and/or also directly from an energy supply system acting as an energy storage device 22.

For the acceleration phase 5 of the press ram, the energy supplied e.g. from the mains (energy supply system) as energy storage device acts on the auxiliary drive, which is preferably implemented as an electric motor 3 and which can be controlled e.g. via a transistor operator or via a mechanical actuating mechanism. The auxiliary drive 3 is implemented such that for the phases of movement (between points 13 and 16 in FIG. 2) requiring high speeds of movement of the press ram 20, it has, with regard to the torque to be transmitted, much smaller dimensions than the dimensions that would result from a dimensioning taking into account the metal-forming phase.

The structural design of the planetary gearing 4 is of such a nature that, with respect to the auxiliary drive shaft 8 (sun gear shaft), the planetary gearing 4 has the smallest possible moment of inertia so that also with regard to an absolute value the energy absorption of the planetary gearing 4 has a minimal value.

The energy dissipation which is necessary during the deceleration of the ram movement (deceleration phase 7 in FIG. 2) so as to reduce the number of revolutions of the crankshaft 10 does not take place in the form of energy losses, but this energy is returned via the electric motor 3 to the energy storage device(s), e.g. the mains or the energy storage age device 6 which is implemented as a magnetic-dynamic energy storage device or as a hydraulic accumulator, where it is then again available for the next acceleration phase 5 of the press ram 20 for feeding into the planetary gearing 4.

In order to guarantee a high torque at the crankshaft 10 for the metal-forming phase 9, a brake 11 is provided at the inlet of the planetary gearing 4 downstream of the coupling point 18 to the electric-motor auxiliary drive 3; said brake 11 only requires a switching energy for coupling in additional brake elements 12, but, apart from this switching energy, it does not absorb any external energy from the main drive 100 or from other external energy sources.

For the metal-forming phase 9 itself, the energy relased in addition to the metal-forming energy is disspated in the usual way via the main drive 100 (motor 1/flywheel 2), the fixed transmission ratio of the planetary gearing 4 and the coupling point 18 of the auxiliary drive 3 towards the frame 19, said coupling point 18 being fixed by the brake 11 in the metal-forming phase 9.

The moments at which the positive acceleration phase begins (point 13) and the moment at which said positive acceleration phase ends (point 14 in FIG. 2) as well as the beginning of the negative acceleration phase (deceleration, point 15 in FIG. 2) as well as the end of this phase 16 in FIG. 2 can be controlled in an arbitrary manner with respect to the crank angle $\gamma_K$, the ram speed being variable during the phases of movement (between 13 and 16 in FIG. 2) via the auxiliary drive 3 in the range of arbitrary positive and negative crank angles, the possibilities of a ram which is standing still and of a reversal of the operating movement of the press ram 20 being included as well.

Instead of being implemented as an electric motor, the secondary drive can also be implemented as a hydrostatic drive, e.g. in the form of hydraulic motor/pump combination.

The present embodiment provides, on the basis of a low-wear implementation of the active elements of the press drive means, a much more flexible method of controlling the speed of the press ram of a metal-forming press, said method being improved significantly primarily with regard to its energy balance.

What is claimed is:

1. Drive means for driving the press ram (20) of a metal-forming press including a stationary frame (19), comprising:
   (a) a press ram (20);
   (b) main drive means (100) for driving said press ram at a given speed, said main drive means including a crankshaft (10) having a freely selected crank angle ($\gamma_K$) for varying the speed characteristic of said press ram, thereby to supply first drive energy to said ram, said main drive means including differential gear means having a drive shaft (8);
   (c) auxiliary drive means (3) connected with said drive shaft for supplying said drive energy to said press ram, thereby to produce a resultant ram speed;
   (d) energy storage means (6,22) connected with said auxiliary drive means, said energy storage means being operable to supply energy to said auxiliary drive means during the period of positive acceleration of said press, and to receive energy from said auxiliary drive means during the period of negative acceleration of said press ram; and
   (e) brake means (11) connected between said drive shaft and said frame for applying a high braking torque to said differential gear means during the metal-forming phase of the press.

2. A driving device according to claim 1, characterized in that the main drive means (100) comprises a flywheel (2) connected with said differential gear means, and a motor (1) for driving said flywheel.

3. A driving device according to claim 2, characterized in that said differential gear means comprises planetary gear means having a sun gear shaft that defines said input shaft.

4. A driving device according to claim 1, characterized in that for establishing a driving connection with the press ram (20) a crankshaft (10) is provided, which is connected to the differential gear means (4).

5. A driving device according to claim 1, characterized in that the auxiliary drive means (3) is an electric motor.

6. A driving device according to claim 5, characterized in that the electric motor (3) is controlled via a transistor operator or provided with a mechanical actuating mechanism.

7. A driving device according to claim 1, characterized in that the energy storage means is an energy supply system (22) of the press drive.

8. A driving device according to claim 1 characterized in that a plurality of said energy storage means are provided in a parallel connection which can be selectively activated.

9. A driving device according to claim 1, characterized in that a process control means (21) is provided for returning the stored energy from the energy storage means (6) via the auxiliary drive means (3) to the main drive means (4).

10. A driving device as defined in claim 1, wherein said energy storage means comprises a magnetic-dynamic storage means.

11. A driving device as defined in claim 1, wherein said energy storage means comprises a hydraulic accumulator.

12. A driving device as defined in claim 1, wherein said auxiliary drive means (3) comprises a hydraulic motor/pump combination.

* * * * *